United States Patent
Liu et al.

(10) Patent No.: US 9,335,379 B2
(45) Date of Patent: May 10, 2016

(54) PRODUCT OUTER SHELL TO INHIBIT CONSUMER DISASSEMBLY

(71) Applicants: AMBIT MICROSYSTEMS (SHANGHAI) LTD., Shanghai (CN); HON HAI PRECISION INDUSTRY CO., LTD., New Taipei (TW)

(72) Inventors: Pei Liu, Shanghai (CN); Xiao-Ying Qiu, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 18 days.

(21) Appl. No.: 14/525,921

(22) Filed: Oct. 28, 2014

(65) Prior Publication Data

US 2015/0362555 A1 Dec. 17, 2015

(30) Foreign Application Priority Data

Jun. 11, 2014 (CN) .......................... 2014 1 0257036

(51) Int. Cl.
*G01R 31/327* (2006.01)
*H02H 3/00* (2006.01)
*H01L 27/02* (2006.01)

(52) U.S. Cl.
CPC ........ *G01R 31/3277* (2013.01); *G01R 31/3278* (2013.01); *H01L 27/0248* (2013.01)

(58) Field of Classification Search
CPC ........... G01R 31/3277; G01R 31/3278; H01L 27/0248

USPC .................. 324/415; 361/1, 600, 679.01, 807
See application file for complete search history.

(56) References Cited

U.S. PATENT DOCUMENTS

| | | | |
|---|---|---|---|
| 6,588,242 B1 | 7/2003 | Beaty | |
| 2010/0271168 A1* | 10/2010 | Niedzwiecki | H01H 9/102 337/194 |
| 2010/0296259 A1* | 11/2010 | Kung | H05K 5/0208 361/807 |
| 2015/0271403 A1* | 9/2015 | Black | G01P 15/0891 250/215 |

FOREIGN PATENT DOCUMENTS

| | | |
|---|---|---|
| CN | 101187274 B | 12/2010 |
| CN | 201667076 U | 12/2010 |
| EP | 2733854 A2 | 5/2014 |

(Continued)

*Primary Examiner* — Hoai-An D Nguyen
(74) *Attorney, Agent, or Firm* — Novak Druce Connolly Bove + Quigg LLP

(57) ABSTRACT

A product outer shell containing its own record of any private and unwarranted disassembly includes a first outer element, a second outer element detachably connected with the second outer element, a consumer disassembly inhibiting structure. The consumer disassembly inhibiting structure includes a circuit board, a plurality of special conductive bodies, a plurality of general conductive bodies, and a positioning plate. The special conductive bodies and general conductive bodies all have the same structures and each is secured on the circuit board to electrically connect to a chip located on the circuit board. A conductive piece is positioned on the positioning plate and is coupled with the special conductive bodies. The chip is configured to record electric connections between the special conductive bodies and the conductive piece, the original electric connections being changed to other or no connections after any disassembly of the product outer shell.

7 Claims, 5 Drawing Sheets

(56) References Cited

FOREIGN PATENT DOCUMENTS

| | | |
|---|---|---|
| JP | 2007-65250 A | 3/2007 |
| TW | I262257 | 9/2006 |
| TW | I361364 | 4/2012 |
| TW | I415554 | 11/2013 |

* cited by examiner

PRODUCT OUTER SHELL TO INHIBIT CONSUMER DISASSEMBLY

FIELD

The subject matter herein generally relates to hardware reinforcing manufacture warranties.

BACKGROUND

A label is pasted on an electronic device to prevent the electronic device from being privately disassembled during a warranty period. However, the label may also be damaged in a normal use of the electronic device, and this may give rise to an erroneous assumption by the issuer of the warranty.

BRIEF DESCRIPTION OF THE DRAWINGS

Implementations of the present technology will now be described, by way of example only, with reference to the attached figures.

DETAILED DESCRIPTION

Figure 1:
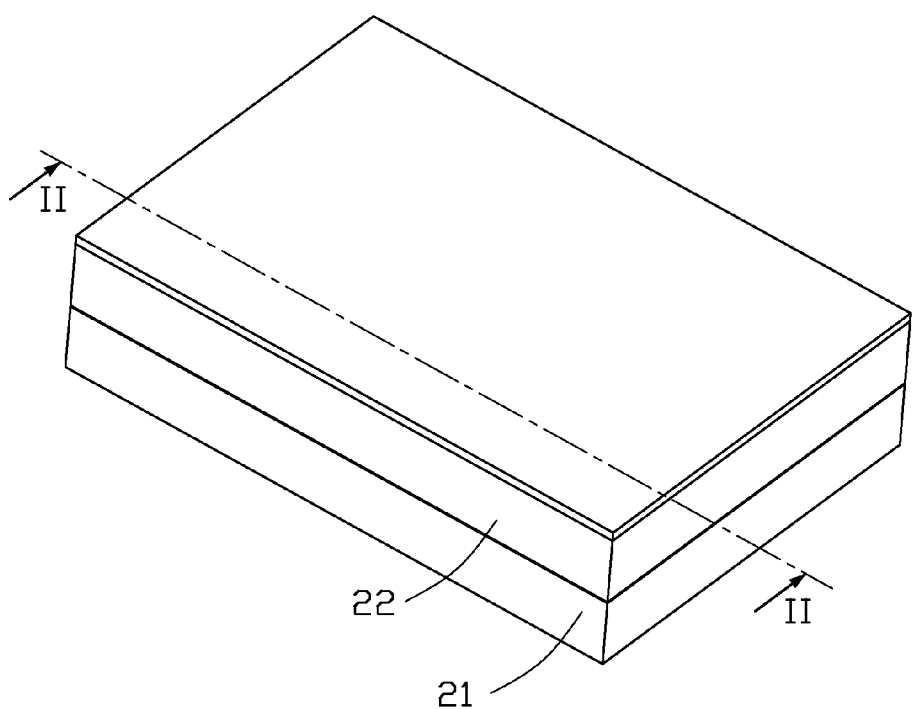
FIG. 1 is an isometric view of an embodiment of a product outer shell with a consumer disassembly inhibiting structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a product outer shell 10 for incontrovertibly indicating, and thus preventing, a privately disassembly of the product outer shell 10.

Figure 2:
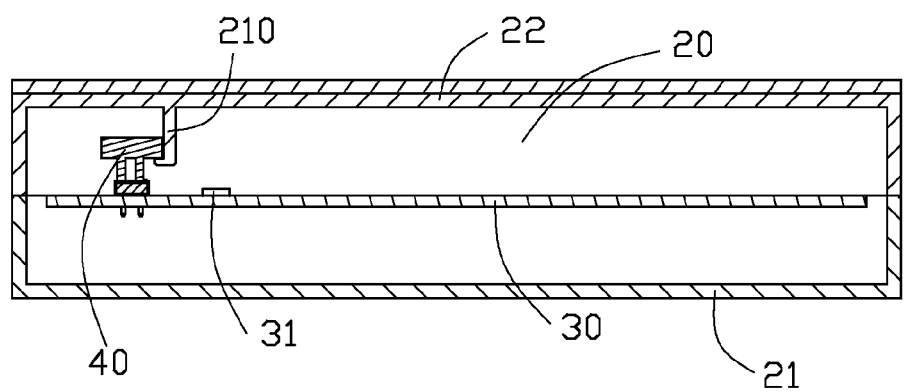
FIG. 2 is a cross sectional view of the product outer shell with a consumer disassembly inhibiting structure, taken along line II-II of FIG. 1.
Figure 3:
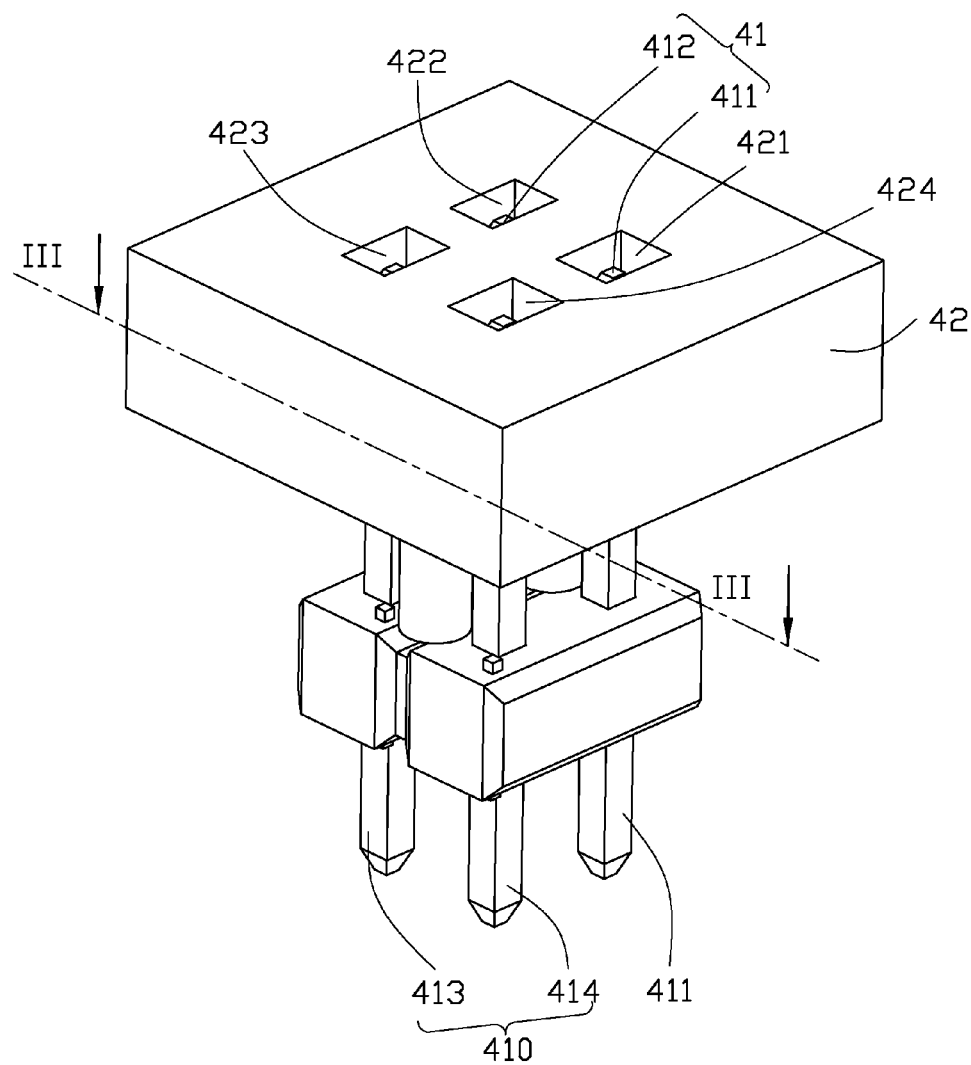
FIG. 3 is an isometric view of the consumer disassembly inhibiting structure of FIG. 2.
Figure 4:
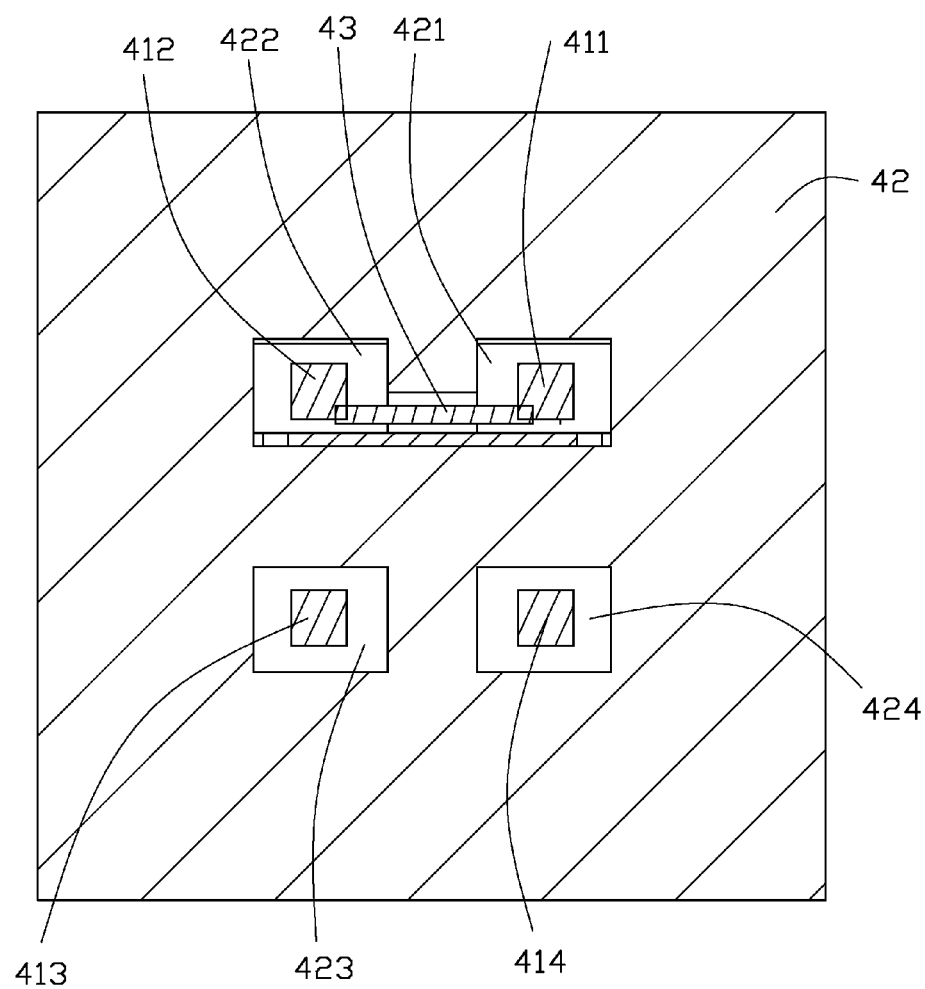
FIG. 4 is a cross sectional view of the consumer disassembly inhibiting structure of FIG. 3, taken along line III-III of FIG. 3.
Figure 5:
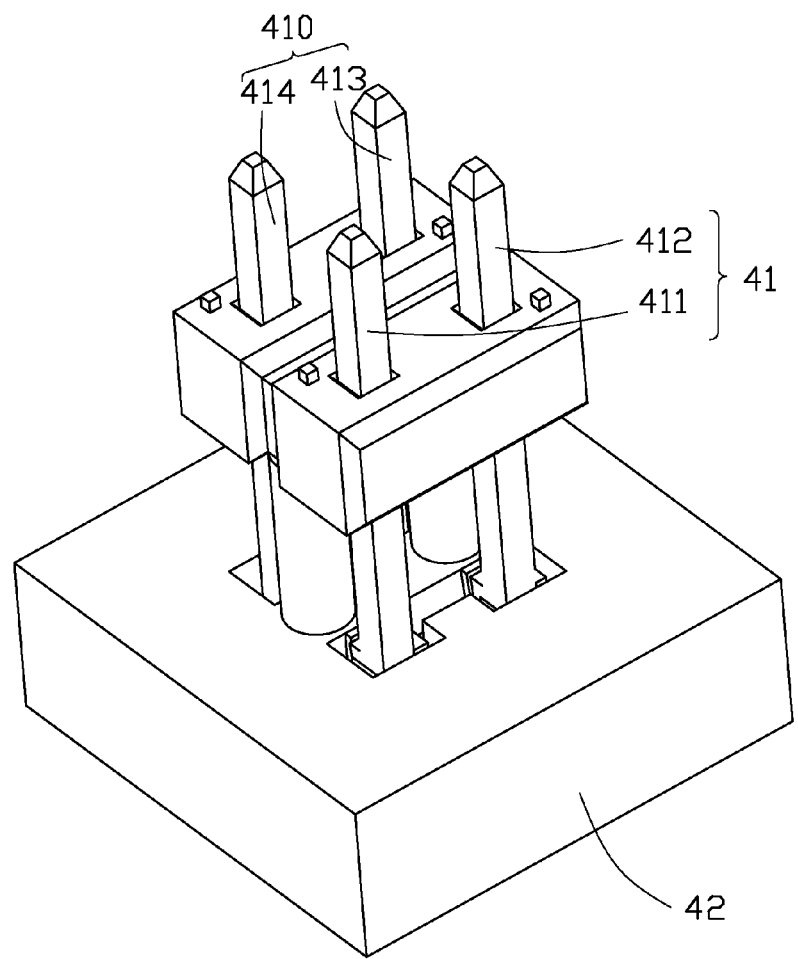
FIG. 5 is an isometric view of the consumer disassembly inhibiting structure of FIG. 3.

FIG. 1-5 illustrate a product outer shell 10 to inhibit consumer disassembly of the disclosure. The product outer shell 10 includes a consumer disassembly inhibiting structure 40, a first outer element 21, and a second outer element 22 detachably connectable with the first outer element 21 to define a substantially enclosed space 20 to house the product.

The second outer element 22 includes a hook 210 facing the first outer element 22. The consumer disassembly inhibiting structure 40 are located between the first outer element 21 and the second outer element 22.

The consumer disassembly inhibiting structure 40 includes a circuit board 30, a pair of special conductive bodies 41, a pair of general conductive bodies 410, a positioning plate 42, and a computer chip 31. The pair of special conductive bodies 41, the pair of general conductive bodies 410, and the computer chip 31 are fixed on the circuit board 30.

The special conductive bodies 41 include a first special conductive body 411 and a second special conductive body 412. The general conductive bodies 410 include a first general conductive body 413 and a second general conductive body 414. The first special conductive body 411, the second special conductive body 412, the first general conductive body 413, and the second general conductive body 414 all have same structure, and each is secured on the circuit board 30 and arranged in a square and are electrically coupled with the chip 31 by the circuit board 30.

The positioning plate 42 is insulated. The positioning plate 42 includes a conductive piece 43 and defines a first through hole 421, a second through hole 422, a third through hole 423, and a fourth through hole 424 respectively corresponding to the first special conductive body 411, the second special conductive body 412, the first general conductive body 413, and the second general conductive body 414. The conductive piece 43 covers the first through hole 421 and the second through hole 422.

In assembly, the first special conductive body 411 is fixed in the first through hole 421, the second special conductive body 412 is fixed in the second through hole 422, the first general conductive body 413 is fixed in the third through hole 423, and the second general conductive body 414 is fixed in the fourth through hole 424. As a result, the first special conductive body 411 and the second special conductive body 412 are electrically coupled with the conductive piece 43. When the second outer element 21 is coupled with the first outer element 22, the positioning plate 42 is hooked by the hook 210. The product outer shell 10 is thus assembled.

When the second outer element 21 is separated from the first outer element 22 by an operation of the user, the hook 210 separates the positioning plate 42 from the special conductive bodies 40 and the general conductive bodies 410. The structures of the special conductive bodies 41 and the general conductive bodies 410 are identical, and precise reinstatement of the special conductive bodies 40 with the conductive piece 43 cannot easily be achieved by the user. The probability is that, in attempted reassembly after the separation, the first special conductive body 411 may be fixed in a through hole rather than in the first through hole 421, and the second special conductive body 412 may be fixed in a through hole other than in the second through hole 422. Thus, the conductive piece 43 cannot be electrically coupled with the special conductive bodies 41.

The computer chip 31 is configured to record and output the connections between the conductive piece 43 and the special conductive bodies 41, and to generate signals according to the connections. The connection relationships of the conductive piece 43 and the special conductive bodies 43 can include a first connection relationship in which the first special conductive body 411 is fixed in the first through hole 421 and the second special conductive body 412 is fixed in the second through hole 422. A second connection relationship can be that the first special conductive body 411 is not fixed in the first through hole 421 or that the second special conductive body 412 is not fixed in the second through hole 422. The generated signals include a first signal generated according to the first connection relationship, and a second signal generated according to the second connection relationship. In this embodiment, when the second signal is generated, the product outer shell 100 is rendered incapable of functioning.

Thus, the question of whether the product outer shell 10 has ever to be opened can be determined by accessing to the computer chip 31.

In the embodiment, the quantity of the special conductive bodies 41 is two. The quantity of the general conductive bodies 410 is two. In other embodiments, the quantity of the special conductive bodies 41 and the general conductive bodies 410 can be more than two.

The embodiments shown and described above are only examples. Many details are often found in the art such as the other features of a product outer shell. Therefore, many such details are neither shown nor described. Even though numerous characteristics and advantages of the present technology have been set fourth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A product outer shell to inhibit consumer disassembly, comprising:
   one or more first outer elements;
   one or more second outer elements detachably connectable with the one or more first outer elements to define a substantially enclosed space to house the product;
   a consumer disassembly inhibiting structure positioned within the substantially enclosed space, the consumer disassembly inhibiting structure comprising:
      a circuit board positioned within the substantially enclosed space;
      a positioning plate engaged with one of the one or more second outer elements, the positioning plate including one or more conductive pieces;
      one or more special conductive bodies fixed on the circuit board;
      one or more general conductive bodies fixed on the circuit board; and
      a computer chip electrically connected to the one or more special conductive bodies, the one or more general conductive bodies and the one or more conductive pieces;
   wherein, both the one or more special conductive bodies and the one or more general conductive bodies are not be in contact with the conductive pieces at the same time;
   wherein, when one of the one or more special conductive bodies is in contact with one of the one or more conductive pieces, a first relationship is established;
   wherein, when one of the one or more general conductive bodies is in contact with one of the one or more conductive pieces, a second relationship is established;
   wherein, when the second outer element engaged with the positioning plate is detached from the one or more first outer elements, the first relationship is broken;
   wherein, when the second outer element is reattached to the one or more first outer elements, the second relationship may be established; and
   wherein, the computer chip records the establishment of the first relationship and the second relationship.

2. The product outer shell to inhibit consumer disassembly of claim 1, wherein the second outer element comprises a hook engaged with the positioning plate, when the second outer element is removed from the first outer element, the hook separates the positioning plate from the conductive bodies, and the positioning plate is detached from the second outer element.

3. The product outer shell to inhibit consumer disassembly of claim 1, wherein when the one of the one or more special conductive bodies is detached from the conductive piece, the product outer shell to inhibit consumer disassembly is rendered incapable of functioning.

4. The product outer shell to inhibit consumer disassembly of claim 3, wherein when all of the one or more special conductive bodies are electrically connected with the conductive piece, the product outer shell to inhibit consumer disassembly works properly.

5. The product outer shell to inhibit consumer disassembly of claim 1, wherein a structure of the special conductive body is the same as a structure of the general conductive body.

6. The product outer shell to inhibit consumer disassembly of claim 5, wherein the special conductive bodies and the general conductive bodies are arranged on the circuit board in a square.

7. The product outer shell to inhibit consumer disassembly of claim 6, wherein the positioning plate defines a plurality of through holes respectively corresponding to the special conductive bodies and the general conductive bodies, the conductive piece is received in the one or more through holes, and the special conductive bodies and the general conductive bodies are fixed in the through holes.

* * * * *